(No Model.) 2 Sheets—Sheet 1.
P. J. PARSONS & A. N. JONES.
ICE VELOCIPEDE.
No. 534,574. Patented Feb. 19, 1895.
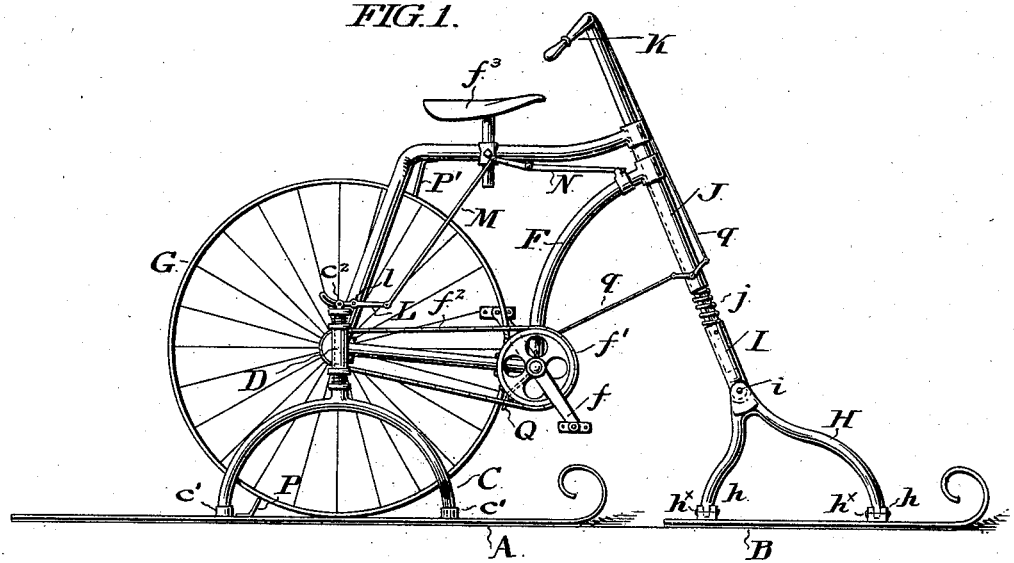
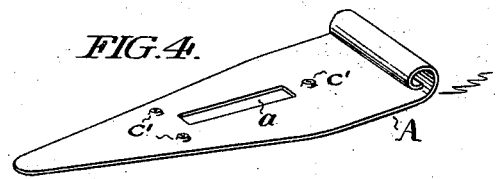
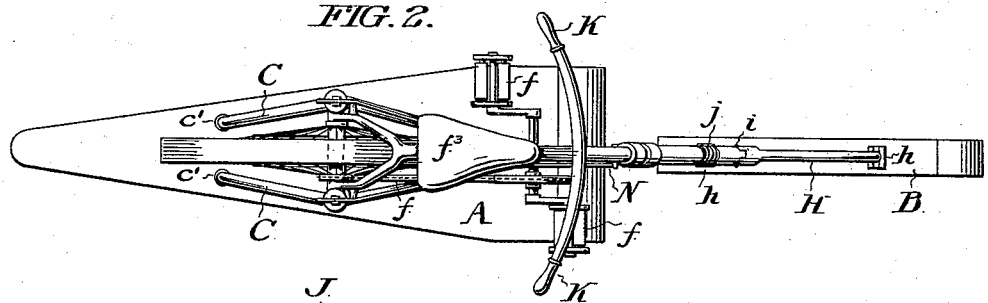
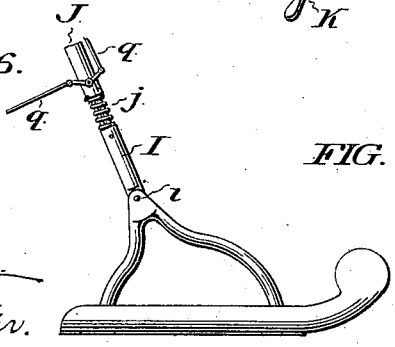
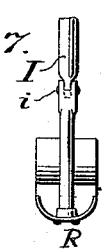
WITNESSES:
N. E. Page
Thos. K. Lancaster.
Paul J. Parsons,
Alexander N. Jones,
INVENTORS
By their attorneys
Strawbridge & Taylor (No Model.) 2 Sheets—Sheet 2.
P. J. PARSONS & A. N. JONES.
ICE VELOCIPEDE.
No. 534,574. Patented Feb. 19, 1895.
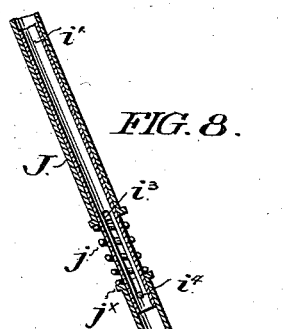
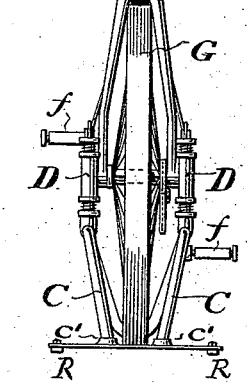
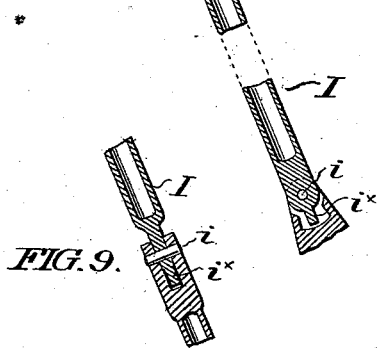
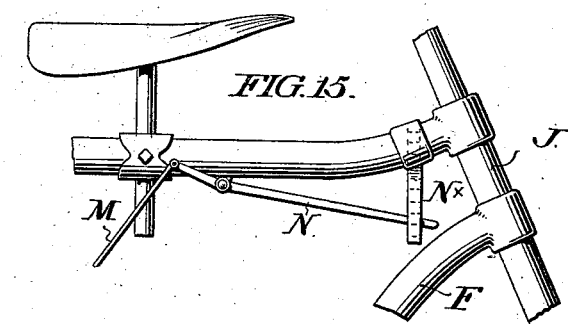
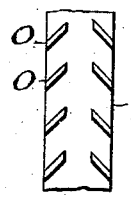
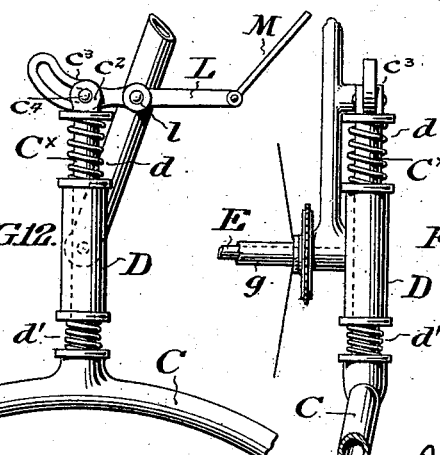
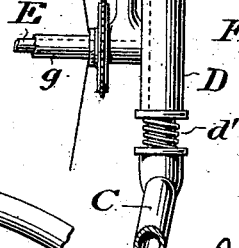
WITNESSES:
N. E. Paige
Thos. K. Lancaster
INVENTORS
Paul J Parsons
A. N. Jones
By their attorneys
Strawbridge & Taylor

UNITED STATES PATENT OFFICE.

PAUL J. PARSONS AND ALEXANDER N. JONES, OF PHILADELPHIA, PENNSYLVANIA.

ICE-VELOCIPEDE.

SPECIFICATION forming part of Letters Patent No. 534,574, dated February 19, 1895.

Application filed April 30, 1894. Serial No. 509,492. (No model.)

*To all whom it may concern:*

Be it known that we, PAUL J. PARSONS and ALEXANDER NEWITT JONES, citizens of the United States, and residents of Philadelphia, in the county of Philadelphia and State of Pennsylvania, have invented certain new and useful Improvements in Ice-Vehicles, of which the following is a specification.

Our invention relates to vehicles adapted to travel upon a surface of ice or snow, and to be propelled by the person riding or occupying the vehicle, and it is the object of our invention to provide a vehicle of this character which shall be inexpensive in construction, not liable to get out of order, and capable of easy and positive operation.

In the accompanying drawings we show and herein we describe a good form of a convenient embodiment of our invention, the particular subject-matter claimed as novel being hereinafter definitely specified.

In the accompanying drawings, Figure 1 is a view in side elevation; Fig. 2, a top plan view, and Fig. 3 a rear elevation, of a vehicle embodying a preferred form of our invention. Figs. 4 and 5 are views in perspective illustrating two different forms of construction of runners adapted for employment in connection with our improved vehicle. Fig. 6 is a detail view in side elevation, and Fig. 7 a similar view in rear elevation of the steering runner and the lower part of the front standard. Fig. 8 is a vertical section of the central portion of the front standard. Fig. 9 is a vertical section of the joint between the front standard and its foot. Figs. 10 and 11 are respectively views in front and side elevation of the rim or tire of the driving wheel. Figs. 12 and 13 are respectively views in side and end elevation of the side standards and adjacent parts of the main frame. Fig. 14 is a view in side elevation of a modified form of the devices shown in Fig. 12. Fig. 15 is a view in side elevation of the upper front portion of the main frame and connected parts.

Similar letters of reference indicate corresponding parts.

In the drawings, A indicates the weight runner and B the steering runner of our improved vehicle.

The steering runner is preferably made as narrow as possible, while the weight runner, arranged as shown in tandem with the steering runner, is of sufficient breadth to afford a footing for the side standards and to allow of a considerable lateral shifting of the center of gravity of the superimposed apparatus and the driver without upsetting.

C C are a pair of side standards, vertically erected from the weight runner, spaced apart a sufficient distance to accommodate the driving wheel between them, preferably each made as to its lower portion in the form of an arch, as shown, and entered as to its lower extremities in bosses $c'$ erected upon the upper face of the runner, and each as to its upper portion formed or provided with a rigid vertical upwardly extending pin $C^\times$ the upper extremity of each of which pins is provided with a head C.

As a matter of convenience, the lower front extremities of the two side standards C may be entered in a common boss.

D D are a pair of collars or sleeves respectively mounted upon and adapted for vertical movement with respect to the vertical pins $C^\times$, and $d\,d'$ are spiral springs mounted upon said pins $C^\times$ respectively above and below said collar.

E is a transverse bar extending from one collar D to the other, and rigidly connected to both, upon which shaft the rear extremity of the main frame F is mounted for support,— and upon which is also mounted the driving-wheel G and the usual driven sprocket wheel rigidly connected therewith.

The main frame F may be of any such construction as is usual in ordinary bicycles and it is, in the form illustrated, provided with a pedal crank and pedals $f$, a driving sprocket wheel mounted upon the pedal shaft, a sprocket chain $f^2$ connective of the driving and driven sprocket wheels, and a saddle $f^3$.

Upon the steering runner B is mounted a foot bracket H, approximately of an A-shape, the lower extremities of which are so pivotally connected with respect to ears or lugs $h^\times$ erected upon the upper surface of the steering runner that said foot and runner are adapted for lateral pivotal movement with respect to each other.

I is the front standard of the machine, the lower extremity of which is so pivotally connected by a transverse pivot $i$ with the apex of the foot bracket H that said bracket and its runner are adapted as a whole to have pivotal movement in the plane of the runner with respect to said front standard.

The lower extremity of the front standard below the pivot $i$ is, as shown in Fig. 9, provided with a finger $i^x$ which extends into a recess in the upper portion of the bracket H, said recess being of such dimensions as will permit of any ordinary swinging movement of the front runner and its bracket with respect to its pivot $i$, but will, by its encounter with one or the other of the end walls of said recess, prevent such undue pivotal movement of the said runner as would result in the temporary disarrangement of the vehicle. J is a sleeve mounted upon said front standard and to said sleeve is connected the front extremity of the main frame F.

$j$ is a spiral spring surrounding the front standard and bearing respectively against the lower extremity of the sleeve J and a shoulder $j^x$ formed upon the lower portion of the said front standard.

The front standard is provided at its upper extremity with a handle bar K the movement of which in one or the other direction by the rider will through the standard I and foot bracket H be communicated to the steering runner B.

In order to permit of the lengthening and shortening of the front standard without impairing its capacity for transmitting rotary movement of the handle bar to the steering runner we form it in two sections (see Fig. 8) the upper of which we designate $i$, and the lower of which, designated $i^2$, is, for a portion of its length, hollow, its bore being of sufficient diameter to permit of the entrance within it of the lower portion of the section $i'$.

The section $i'$ is provided at its lower portion with a slot $i^3$ of length at least equal to the range of desired variations in length of the front standard, and the section $i^2$ is provided with a stud or pin $i^4$ which passes through said slot $i^3$. The stud or pin $i^4$ prevents the withdrawal of the section $i'$ and compels the participation of the section $i^2$ in any movement of rotation imparted through the handle bar to said section $i'$.

The weight runner embodies a wheel opening $a$ in its center portion and beneath the axis of the driving wheel, through which said wheel may extend to make contact with the surface of snow or ice upon which the vehicle travels, hereinafter for convenience termed the "ground," so that, when rotation of said wheel is occasioned, said wheel will by its contact with said surface occasion the propulsion of the vehicle.

The vehicle is adapted both for coasting and for being driven by the rotation of the driving-wheel.

When used for coasting the driving wheel is to be maintained clear of the ground, and when positively driven said wheel is to be in contact with the ground.

The normal positions of the parts may be said to be that illustrated in Fig. 1, in which the wheel is supported clear of the ground.

The mounting and arrangement of the wheel with reference to the side standards is such that the wheel may at will with great ease be placed in either position of adjustment. The operative mechanism by which the wheel is governed in this respect is as follows:—The upper extrimeties of each of the pins $C^x$ (see Fig. 12) is provided with a pair of ears $C^3$ between which is entered and secured by the pivot $C^4$ the slotted curved rear extremity of a lifting lever L fulcrumed or pivotally attached by the pivot $l$ to an adjacent portion of the frame-work. The depression of the front extremity of said lever L will through the engagement of its rear end with the pin $C^x$ occasion the depression of the main frame to which said lever is pivoted, and said main frame will carry down the sleeves D (compressing the springs $d'$) and the wheel axle E and the driving wheel until said driving wheel makes contact with the ground. On the other hand, the elevation of the front extremity of said lever will, of course, through its bearing or support upon the pivot $C^4$, elevate, through its pivot $l$, the rear portion of the main frame to which it is connected, the sleeves D, (compressing the spring $d$) and lift the driving wheel journaled in said main frame. When the driving wheel is in contact with the ground the depth of the "bite" of the wheel may also be regulated at will by the throw of the lever. The lever L is conveniently operated by providing it with a link M connected to its front extremity and to the rear extremity of a lever N pivotally mounted at the front of the machine conveniently just beneath the back-bone of the main frame in position to be readily grasped by the driver.

$N^x$ is a rack of any preferred character attached to the main frame in proximity to the handle of the lever, by the engagement of which handle in the notches of which rack the maintenance of the driving wheel and the weight runner in either of their sets may be secured.

A modified form of the lever L, is shown in Fig. 14 in which, instead of being secured to the pin $C^x$ by a stud and slot connection, said lever is connected to said pin by a short link $l'$.

The rim of the driving wheel is, to enable it to take a positive hold upon the surface of the ground, provided with a double series of teeth O which extend along the respective edges of said rim, leaving a smooth and uninterrupted space or zone in the center thereof. These teeth, which are shown as oblique with relation to the wheel axis, may be, as shown in Fig. 11, formed as independent blocks attached to the face of the rim by screws passthrough the body of said rim.

P P' are a pair of scrapers, being each formed as an angular piece of selected material, one mounted upon the weight runner and having a projecting extremity extending upward against the smooth face of the wheel, the other mounted upon the backbone of the machine and having its free extremity depending against said smooth face of the wheel. These scrapers operate to remove any accumulation of snow or ice from the said smooth surface of the wheel so that a brake mounted for operation with respect to said wheel may bear directly against the said rim. Said brake, shown in Fig. 1, and designated Q, is of ordinary construction, and is connected by any ordinary series of links and levers q to an operating handle mounted in connection with the steering handle in a manner usual in the construction of ordinary bicycles.

The bodies of the runners may be made in any preferred manner by resorting to any of the known expedients of construction and manufacture of ice and snow runners as employed in connection with sleighs, skates, sleds, toboggans and similar structures. In Figs. 4 and 5 we show, as examples, two types of runners adapted for employment in connection with our improved ice vehicle.

Each of the runners is preferably provided, as to its under face, with one or a series of longitudinally disposed steel ribs or blades, R, as shown in Figs. 3 and 7.

The ribs or blades R are preferably so applied to the runners that they may be removed at will for the purpose of substitution or repair. These ribs or blades enable the runners to take secure hold of the surface over which the vehicle travels, and thereby add to the reliability of the vehicle as a whole.

As will be understood, by virtue of the construction described, the vehicle is flexible and readily follows any inequalities existing in the surface over which it travels.

Having thus described our invention, we claim—

1. In an ice vehicle, in combination, the main frame, the steering runner, the weight runner, side standards erected from said weight runner and equipped with vertical pins, sleeves mounted upon said pins and connected with the main frame, an axle supported upon said sleeves, a driving wheel mounted upon said axle and means for occasioning the vertical adjustment of said sleeves,—substantially as set forth.

2. In an ice vehicle, in combination, the main frame, the steering runner, the weight runner embodying the wheel opening, side standards erected upon said weight runner and equipped with vertical pins, sleeves mounted upon said pins and connected with the main frame, springs mounted upon said pins, respectively above and below said sleeves, a driving wheel mounted upon said axle and means for occasioning the vertical adjustment of said sleeves,—substantially as set forth.

3. In an ice vehicle, in combination, the main frame, the steering runner, the weight runner, side standards erected from said weight runner and equipped with vertical pins, sleeves mounted upon said pins and connected with the main frame, an axle supported upon said sleeves, a driving wheel mounted upon said axle, levers connected to said pins and to the main frame, and means for operating said levers,—substantially as set forth.

4. In an ice vehicle, in combination, the main frame, the steering runner, the weight runner, side standards erected from said weight runner and equipped with vertical pins, sleeves mounted upon said pins and connected with the main frame, an axle supported upon said sleeves, a driving wheel mounted upon said axle, levers pivotally connected to said vertical pins and to the main frame, an operating handle mounted upon the front part of the main frame and a connection between said operating handle and said levers,—substantially as set forth.

5. In an ice vehicle, in combination, the main frame, the weight runner, a driving wheel and means for rotating the same, a front standard, a steering runner and a foot bracket pivotally connected to the front standard and to the steering runner,—substantially as set forth.

6. In an ice vehicle, in combination, the main frame, the weight runner, the driving wheel, means for rotating the same, the steering runner, the front standard, a foot bracket pivotally connected to the steering runner so as to have lateral movement with respect thereto and pivotally connected to the front standard so as to have a longitudinal swinging movement with respect thereto,—substantially as set forth.

7. In an ice vehicle, in combination, the main frame, the weight runner, a driving wheel and means for rotating the same, the steering runner, the foot bracket pivotally connected thereto, the front standard pivotally connected to said foot bracket so that the latter is free for longitudinal swinging movement with respect to said front standard, and a finger projecting from said front standard into a recess in said foot bracket,—substantially as set forth.

In testimony that we claim the foregoing as our invention we have hereunto signed our names this 26th day of February, A. D. 1894.

PAUL J. PARSONS.
ALEXANDER N. JONES.

In presence of—
HARRY J. FRANZ,
CHAS. G. GUGLER.